(12) United States Patent
Face, Jr.

(10) Patent No.: US 6,177,185 B1
(45) Date of Patent: Jan. 23, 2001

(54) COMPOSITE CONCRETE STRUCTURE INCLUDING AN IMIDE LAYER AND METHOD FOR MAKING SAME

(75) Inventor: Samuel A. Face, Jr., Norfolk, VA (US)

(73) Assignee: Face International Corp., Norfolk, VA (US)

( * ) Notice: Under 35 U.S.C. 154(b), the term of this patent shall be extended for 0 days.

(21) Appl. No.: 09/156,229

(22) Filed: Sep. 18, 1998

Related U.S. Application Data
(60) Provisional application No. 60/060,137, filed on Sep. 26, 1997.

(51) Int. Cl.[7] .................................................. B32B 13/12
(52) U.S. Cl. ........................ 428/325; 52/514; 52/725; 428/41.7; 428/41.9; 428/473.5
(58) Field of Search ..................... 428/40.1, 41.7, 428/41.8, 40.9, 325, 473.5; 52/514, 725

(56) References Cited

U.S. PATENT DOCUMENTS
5,218,810 * 6/1993 Isley ........................................ 52/725

FOREIGN PATENT DOCUMENTS
59-73193 * 4/1984 (JP).

* cited by examiner

*Primary Examiner*—Nasser Ahmad
(74) *Attorney, Agent, or Firm*—Stephen E. Clark; David J. Bolduc

(57) ABSTRACT

A composite structure is provided which resists corrosion and cracking due to water seepage and roadway use. The composite structure of reinforced concrete is wear resistant through bonding it to a liquid-impermeable overlay such as latex concrete with an adhesive imide. The imide has great adhesion to the concrete and has a thermal expansion and flexural strength comparable to the reinforced steel which prevents delamination of the imide and the overlay as road, bridge or deck roof is subjected to traffic and the elements.

3 Claims, 2 Drawing Sheets

COMPOSITE CONCRETE STRUCTURE INCLUDING AN IMIDE LAYER AND METHOD FOR MAKING SAME

This application claims benefit to U.S. provisional application No. 6/060,137 filed Sep. 26, 1997.

BACKGROUND OF THE INVENTION

1. Field of Invention

The present invention relates to composite concrete structures. More particularly the present invention is directed to a multi-layered composite structure in which a high-tensile strength, liquid-impermeable imide layer is bonded to a steel-reinforced concrete layer.

2. Description of the Prior Art

The disclosed invention is a multi-layered composite structure, and a method for making same, which may be advantageously used to form bridge decks, roadway pavements, roofing decks, and the like.

Various materials, notably concrete, used in building construction and other civil engineering projects such as roads and bridges are susceptible to water penetration resulting either from inherent properties of the construction materials (e.g. porosity) or from imperfections (e.g. cracks) in the structures. Such imperfections in the structures may be caused by construction defects, or by deterioration of the structures over time due to harsh environmental conditions such as traffic and weather.

Reducing or eliminating water penetration through such structures is often desirable, particularly for below-grade building walls and for tunnels which permit passage of vehicular or pedestrian traffic under bodies of water. It is also often desirable to reduce or eliminate water penetration through roadway pavement and through bridge decking, because such water penetration may result in corrosion of reinforcing or supporting structural steel embedded in or adjacent to the pavement.

Concrete structures such as bridges, buildings and decks are typically reinforced with steel rebar, wire mesh, or coiled metal elements, for the purpose of providing the concrete structure with strength and rigidity. These concrete structures are expected to remain viable for many years despite the fact that they must withstand harsh environmental conditions. Corrosive agents are known to diffuse through concrete and to degrade reinforcing metals inside concrete structures, thereby reducing the strength of the structure. Chloride-containing compounds are among the most destructive corrosive agents to metal reinforcing materials.

Prior methods of protecting for example concrete roads from the adverse effects of through-concrete water migration have typically involved disposing an overlay comprising a waterproofing material such as latex or epoxy mixed with concrete on top of an underlying concrete base. This prior method has proven somewhat effective; however, two related problems detract from its usefulness.

First, the adhesive bond between the underlying concrete and the overlay is typically weak. When prior overlays (whether latex concrete or otherwise) are placed on an exposed surface of a cured concrete base, the achievable bond between the two layers is typically very weak.

Second, due to the difference between the thermal coefficients of contraction of the waterproofing material and the concrete base of prior pavements, and due the relative rigidity of prior cured waterproofing materials, cracks invariably develop between the adjacent pavement layers over time due to climatological temperature changes. Such cracks permit unwanted migration of water and corrosive agents between the layers and into the underlying concrete. Water trapped between the layers or within the underlying concrete renders the pavement susceptible to cracking and deteriorization due to stress concentrations in the pavement caused by expansion and contraction of the entrapped water as it alternatingly freezes and melts during periods of ambient temperature swings.

Another factor which contributes to the deterioration of the underlying concrete structure in prior pavement schemes is the relatively low tensile strength and inflexibility of the overlay. As a result of high localized stress concentrations caused by heavy traffic, overlays frequently break down over time, causing cracks to develop, and allowing water to permeate the underlying concrete.

SUMMARY OF THE INVENTION

The present invention provides a composite structure including an imide layer with high tensile strength and excellent adhesion properties to be preferably disposed between an underlying concrete structure and a protective overlay. In a preferred embodiment of the invention the imide layer is a tough, soluble, aromatic, thermoplastic copolymide, as developed by NASA-Langley Research Center and disclosed in U.S. Pat. No. 5,639,850, which is incorporated by reference herein. The general purpose of the invention is to provide a composite structure comprising a concrete layer, an overlay and an imide layer disposed therebetween which provides excellent adhesion properties and increased corrosion protection, and which overcomes the aforementioned disadvantages of the prior art.

Accordingly, it is a primary object of the present invention to provide a composite structure including an imide layer disposed on the exposed surface of a concrete layer, wherein the imide layer has high tensile strength and excellent adhesion properties for protecting the underlying concrete layer.

It is another object of the present invention to provide a composite structure of the character described in which the imide layer has a thermal coefficient of expansion comparable to that of concrete.

It is another object of the present invention to provide a composite structure of the character described in which the imide layer is impermeable to water and other liquids.

It is another object of the present invention to provide a composite structure of the character described in which the imide layer has a high flexural strength as compared to prior overlays.

It is another object of the present invention to provide a process for manufacturing a composite concrete structure including an imide layer which is impermeable to water and other liquids wherein the process involves placing and curing a concrete layer, disposing the imide layer on the exposed surface of the concrete layer, disposing an overlay on top of the imide layer, and allowing the imide layer and overlay to cure.

It is another object of the present invention to provide a process for manufacturing a composite concrete structure including an imide layer which has high tensile strength and excellent adhesion properties for protecting the underlying concrete layer.

It is another object of the present invention to provide a process for manufacturing a composite concrete structure including an imide layer which has a high flexural strength as compared to prior overlays.

Further objects and advantages of this invention will become apparent from a consideration of the drawings and ensuing description thereof.

DESCRIPTION OF THE PREFERRED EMBODIMENT

With initial reference directed toward FIG. 2 of the appended drawings a composite structure including an imide layer 12, to be disposed between a concrete layer 18 and an overlay 10, embodying the principles and concepts of the present invention will be described.

Figure 2:
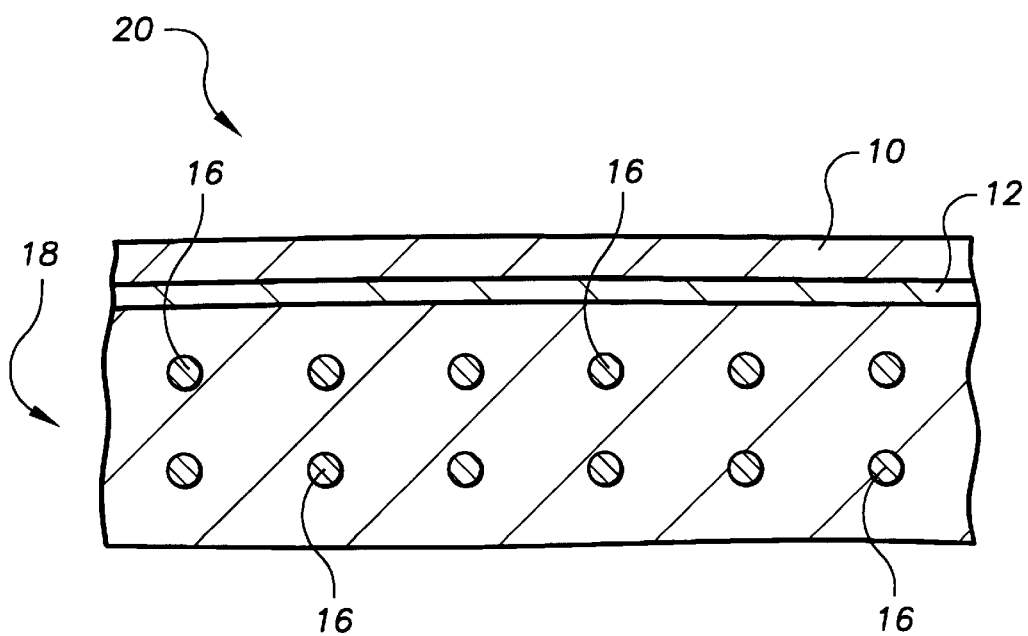
FIG. 2 is a cross-sectional elevation showing an underlying concrete structure, an overlay, and an adhesive layer disposed therebetween.

As shown in FIG. 2, a composite structure 20 constructed in accordance with the preferred embodiment of the present invention comprises an imide layer 12 advantageously disposed on a steel-reinforced concrete layer 18. The concrete layer 18 has steel rebar 16 embedded therein. In the preferred embodiment of the invention, the imide layer 12 is LaRC™-SI, a tough, soluble, aromatic, thermoplastic copolymide developed by NASA-Langley Research Center and disclosed in U.S. Pat. No. 5,639,850 to Bryant. However, it should be understood that it is within the scope of the present invention to use any imide material for the imide layer 12. It is desirable to use LaRC-SI as the imide layer 12 because it has a high flexural strength, has a thermal coefficient of expansion comparable to that of concrete, has a high tensile strength, and excellent concrete-bonding capabilities.

LaRC-SI adheres exceptionally well to concrete. LaRC-SI also has a thermal coefficient of expansion comparable to that of concrete. Therefore, as the composite structure 20 expands and contracts due to ambient heating and cooling, the bond between the imide layer 12 and the concrete layer 18 and/or the overlay 10 is not susceptible to de-laminating. Typical concrete has a thermal coefficient of expansion of 10 to $14 \times 10^{-6}$/deg. C. and LaRC-SI has a thermal coefficient of expansion of $24-46 \times 10^{\times 6}$/deg. C. Because the thermal coefficients of expansion of the imide layer 12 and the concrete layer 18 are both of the same order of magnitude (i.e. both between 7 and $50 \times 10^{-6}$/deg. C.), and because the flexibility of the imide layer 12, the layers 10, 12, and 18 of the composite structure 20 cannot be easily delaminated, which prevents water and other liquids from becoming trapped between the layers of the composite structure 20.

The following example, taught in the patent to Bryant (U.S. Pat. No. 5,639,850), is reproduced herein to illustrate typical tensile properties of LaRC-SI: Copolyimide films were prepared from polyamic acid solutions using the following procedure. The polyamic acid solutions were doctored onto plate glass and placed in a dust free chamber until they were tack free. The dry polyamic acid films were cured at 100 deg. C., 200 deg. C., and 300 deg. C. for 1 hour each in air. The thin films were cut into 0.20 inch strips and the tensile properties were determined at several temperatures. Representative properties of films manufactured by this method are given in Table 1.

TABLE 1

| OPDA/BPDA ratio | Test Temperature (deg. C.) | Tensile Strength (Ksi) | Tensile Modulus (Ksi) | % Elongation |
|---|---|---|---|---|
| 100/0 (control) | 23 | 18.2 +/− 1 | 468 +/− 2 | 6.8 +/− 1 |
| 75/25 | 23 | 17.6 +/− 1.1 | 443 +/− 26 | 17.1 +/− 11 |
| 50/50 | 23 | 17.4 +/− .4 | 451 +/− 14 | 9.5 +/− 1 |
| 25/75 | 23 | 18.9 +/− .4 | 469 +/− 7 | 7 +/− 1.5 |
| 0/100 (control) | 23 | 17.1 +/− 2 | 589 +/− 25 | 4.7 +/− 0.8 |

Typical non-reinforced concrete has a tensile strength of 250–350 psi. In the preferred embodiment of the invention concrete layer 18 has a tensile strength of between 250 and 350 psi, and the imide layer 12 has a tensile strength of at least 350 psi, but preferably at least 15000 psi.

The next example, also taught in the patent to Bryant (U.S. Pat. No. 5,639,850), is useful in demonstrating the typical flexural properties of LaRC-SI such as may be used for the imide layer 12 in the present invention: Matrix composites were prepared using a 50/50 blend of BPDA/ODPA at a 2% offset and endcapping with phthalic anhydride. Iron, diamond dust, Upilex R™ plastic powder, quartz, graphite and graphite/copper combinations were the powders used to prepare the composites. In this example, the copolyimide serves as a binder for the particles. Three point bend geometry testing was performed on the graphite and graphite/copper composites at 23 deg. C. The results of this testing are given in Table 2.

TABLE 2

| Material Composition (% by weight) | Molding Conditions min/Ksi/ deg. C. | Flexural Modulus (Msi) | Flexural Strength (psi) | % Strain |
|---|---|---|---|---|
| Graphite/PI (86.5/13.5) | 30/10/300 | 2.36 | 6130 | 0.3 |
| Graphite/ Copper/PI (85/5/10) | 30/1.5/350 | 3.00 | 7610 | 0.3 |
| Graphite/ Copper/PI (85/5/10) | 30/5/350 | 2.40 | 5400 | 0.3 |
| Graphite/ Copper/PI (76/19/5) | 30/5/350 | 2.50 | 5400 | 0.3 |

PI-copolyimide

Typical non-reinforced concrete has a flexural strength of 300–1000 psi. In the preferred embodiment of the invention the imide layer 12 has a tensile strength of at least 1000 psi, but preferably at least 5000 psi.

A description of the preferred process for manufacturing the composite structure 20 follows. In order to facilitate and understanding of the present invention, the following disclosure principally describes the preferred process for advantageously placing a concrete composite structure which is in the configuration of a slab. It will be understood, however, that the disclosed process can be used to construct concrete composite structures in forms, shapes and configurations other than slabs.

Figure 3:
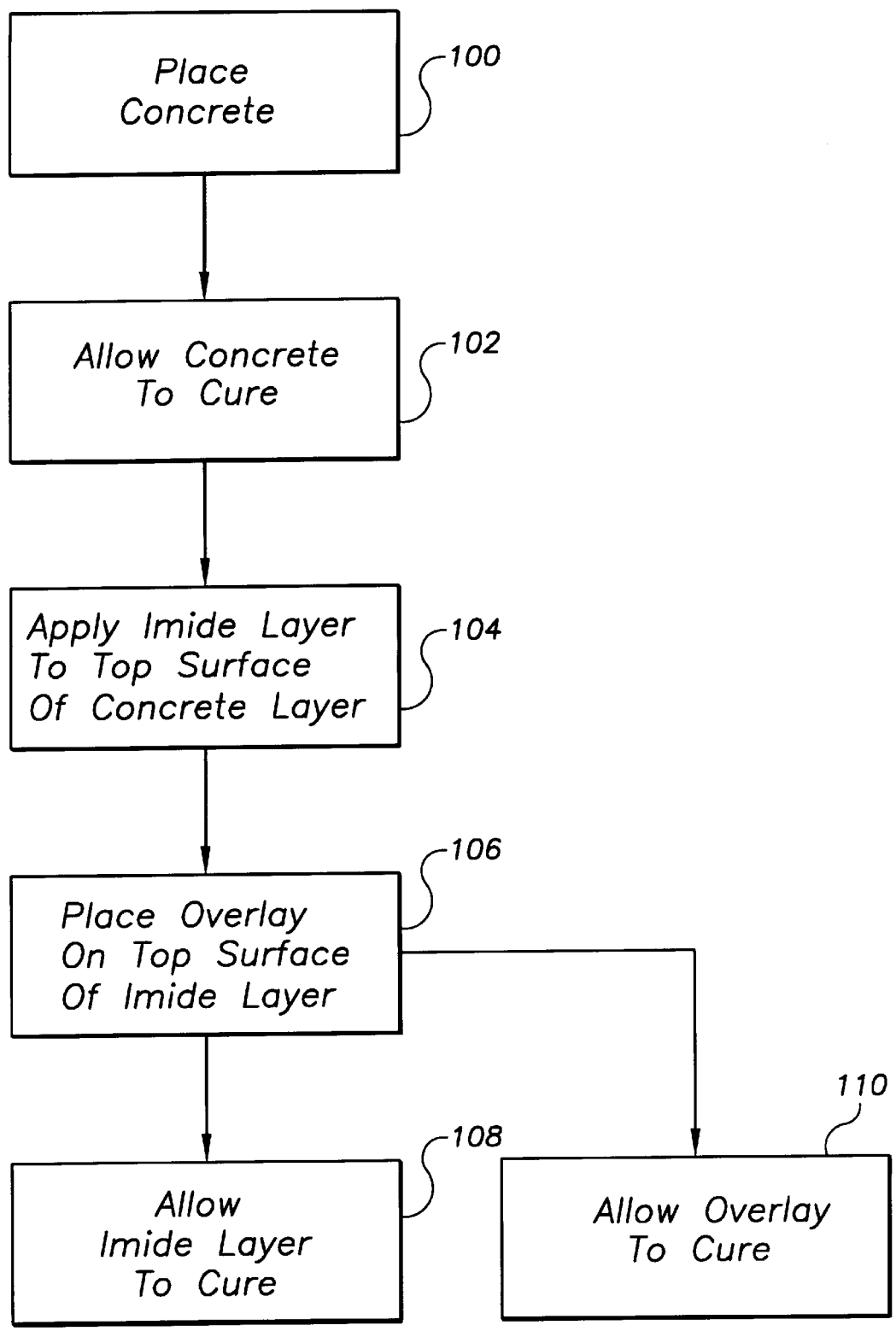
FIG. 3 is a schematic flow diagram showing the steps in the preferred embodiment of the present invention.

FIG. 3 is a flow diagram showing the steps involved in the preferred embodiment of the present invention. Individual steps are denoted by three-digit reference indicia in the corresponding drawing figure.

Figure 1:
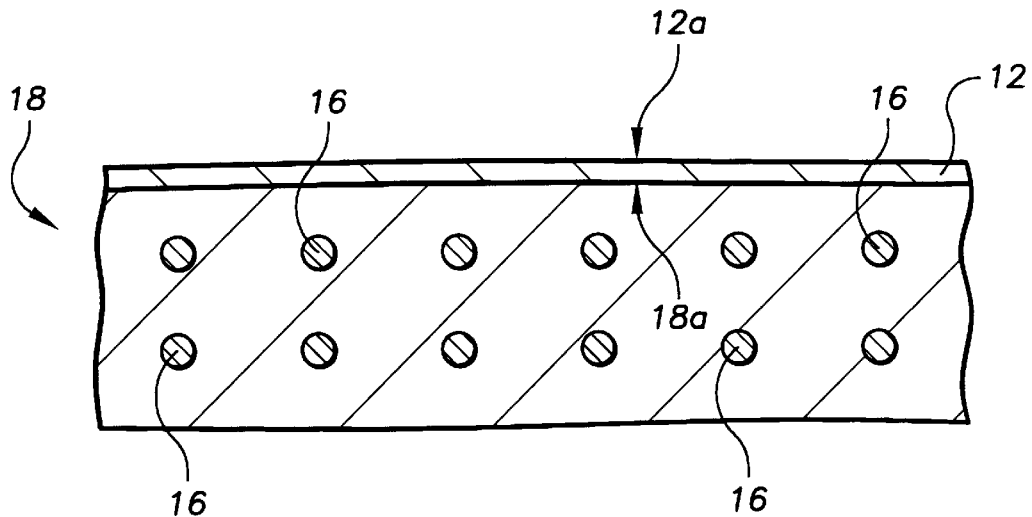
FIG. 1 is a cross-sectional elevation showing an underlying concrete structure with an adhesive layer disposed thereon.

Now referring to FIGS. 1 and 3: The first step in constructing the present invention is placing 100 the concrete layer 18 and allowing it to cure 102. Subsequent to curing 102 the concrete layer 18, the imide layer 12 is applied 104 to the exposed surface 18a of the concrete layer 18, preferably in a soluble gel form, using brushes, squeegees or the like. It should be understood that the imide layer 12 may be applied to the exposed surface 18a of the concrete layer 18 in a number of other forms, including liquid form, which may be poured or sprayed onto the exposed surface 18a of the concrete layer 18. The imide layer 12 may also be applied to the exposed surface 18a of the concrete layer 18 in solid form, such as in the form of a thin deformable sheet, in which case the thin deformable sheet must be subsequently heated above its melting temperature and then cooled to induce adhesion.

As shown in FIG. 2, in the preferred embodiment of the invention, the overlay 10 is then placed 106 on the top surface 12a of the imide layer 12 before the imide layer 12 has cured. The overlay 10 typically comprises latex, a latex cement or a polyester resin which all are substantially impermeable to water and provide a resilient wear surface for vehicle and/or pedestrian traffic. The imide layer 12 and the overlay 10 are then simultaneously allowed to cure 108 and 110, thereby adhering the concrete layer 18 to the overlay 10.

In an alternative embodiment of the present invention, as depicted in FIG. 1, the composite structure 20 may consist of only 2 layers, a concrete layer 18, and an imide layer 12.

It will be appreciated by those skilled in the art that a composite structure 20 manufactured in accordance with the present invention can be advantageously used in the construction of bridge-decks, highways, piers, floors, buildings, sidewalks, tunnels, sewage and drain pipes and other similar structures where it would be advantageous to protect steel from corrosion due to the inclusion of the waterproof imide layer 12.

It will also be appreciated by those skilled in the art that a composite structure 20 manufactured in accordance with the present invention is more durable and less susceptible to delamination than prior laminate concrete structures which include overlays and/or waterproofing layers due to the excellent adhesion characteristics of the imide layer 12.

It will be appreciated by those skilled in the art that a composite structure 20 manufactured in accordance with the present invention has greater tensile strength and flexural strength than prior laminate concrete structures which include overlays and/or waterproofing layers, as a result of the imide layer 12.

While the above description contains many specificities, these should not be construed as limitations on the scope of the invention, but rather as an exemplification of one preferred embodiment thereof. Many other variations are possible, for example:

The imide layer may be applied directly (coated) to steel objects, such as bridge support structure, to prohibit corrosion;

The steel rebar may be coated with the imide layer before being disposed in the concrete;

The imide layer may be added to existing infrastructure (rebar, pilings, columns and the like) during a repair procedure;

The composite concrete structure does not have to be in the form of a slab, it could be a beam, column or any other concrete structure well known in the art;

The imide layer 12 could be applied to the concrete layer 18 before the concrete layer 18 is cured;

The imide layer 12 and the overlay 18 could be heated to expedite curing;

The tensile strength of the imide layer could be less than 350 psi;

The flexural strength of the imide layer could be less than 300 psi;

The thermal coefficient of expansion of the imide layer 12 could be less than $24 \times 10^{-6}$/deg. C. or greater than $46 \times 10^{-6}$/deg. C., provided it retains its advantageous properties;

The imide layer 12 does not have to be an imide, but can be any material which is impermeable to liquids;

The material of the imide layer 12 could be mixed directly into the overlay 10 or the concrete layer 18; and The composite concrete structure 20 does not have to comprise embedded steel members.

Accordingly, the scope of the invention should be determined not by the embodiment illustrated, but by the appended claims and their legal equivalents.

I claim:

1. A composite structure comprising:
   a first load bearing member comprising a concrete layer;
   a first liquid impermeable layer bonded to said load bearing member, said first liquid impermeable layer comprising an adhesive imide layer; and
   a protective overlay bonded to said liquid impermeable layer, said protective overlay comprising a mixture of a latex or an epoxy with concrete.

2. The composite structure of claim 1, wherein said first load bearing member further comprises:
   a steel support structure within said concrete layer.

3. The composite structure of claim 2, wherein said first load bearing member further comprises:
   a second liquid impermeable layer bonded to said steel support structure within said concrete layer.

* * * * *